United States Patent [19]

Seth

[11] Patent Number: 4,524,403
[45] Date of Patent: Jun. 18, 1985

[54] WASHING MACHINE MOTOR SPEED CONTROL CIRCUIT

[75] Inventor: Siya V. Seth, Barking, England

[73] Assignee: U.S. Philips Corporation, New York, N.Y.

[21] Appl. No.: 515,734

[22] Filed: Jul. 21, 1983

[30] Foreign Application Priority Data

Aug. 6, 1982 [GB] United Kingdom ............... 8222699

[51] Int. Cl.³ ............................................. H02H 3/26
[52] U.S. Cl. ................................. 361/86; 318/345 H; 361/33; 361/91
[58] Field of Search ............... 361/33, 86, 88, 91; 318/345 C, 345 D, 345 H, 345 G, 478, 479

[56] References Cited

U.S. PATENT DOCUMENTS

| | | | |
|---|---|---|---|
| 4,065,802 | 12/1977 | Mizukawa et al. | 361/86 X |
| 4,263,646 | 4/1981 | Beatty | 361/86 X |
| 4,355,342 | 10/1982 | Franzolini | 361/91 |

FOREIGN PATENT DOCUMENTS 2377750 9/1978 France ........................... 318/345 H Primary Examiner—Harry E. Moose, Jr.
Attorney, Agent, or Firm—Robert T. Mayer; Bernard Franzblau

[57] ABSTRACT

In washing machine control circuits of the type in which a semiconductor controlled rectifier SCR is arranged in series with the motor M in order to control the speed of the motor, a short circuit fault of the SCR can result in damage to the machine.

A bistable device BD is reset at each zero crossing of the applied mains voltage and is set in each half cycle only if the voltage across the SCR reaches a level which cannot be reached if the SCR is short-circuited. A logic circuit LOG detects any non-setting of the bistable device for three or more consecutive half cycles of the same or alternating polarity and responds thereto by disconnecting the supply to the motor (contact R1).

13 Claims, 4 Drawing Figures

WASHING MACHINE MOTOR SPEED CONTROL CIRCUIT

This invention relates to a washing machine motor speed control circuit including a semiconductor controlled rectifier (SCR) arranged in series with the motor and a trigger circuit for firing the SCR at a controllably variable instant in each half cycle of an AC mains supply voltage applied to the series circuit in order to control the average power applied to the motor.

Circuits of the type defined above are well known and typically include a servo loop which enables the speed of the motor, and hence of the drum, to be kept substantially constant at any value within a predetermined range of values irrespective of the type of wash load in the drum. The range of values is very wide and, in terms of drum speed, extends from a relatively low value (for example 35 r.p.m.) for washing and rinsing to a relatively high value (for example 1,000 r.p.m.) for spin drying the load.

In order to provide this wide range of speeds, the instant in each half cycle at which the trigger circuit fires the SCR, referred to as the firing angle, is controllably variable from a high value (e.g. 150°) at which a relatively low average power is applied to the motor, to a low value (e.g. 18°) at which a relatively high average power is applied to the motor.

If the SCR becomes faulty and develops a short circuit, however, full power is applied to the motor. If the washing machine drum is running at the low speed wash or rinse cycle, the consequent efforts by the motor to speed up the drum causes excessive drum vibration due to the unbalanced load in the drum. If not checked immediately, this vibration can rapidly build up and seriously damage the machine.

Mechanical out-of-balance detectors have been proposed which detect excessive vibration of the drum and switch off the AC supply voltage to the motor. Such an arrangement, however, has several disadvantages. Firstly, it is complex and hence costly; secondly it requires mechanical adjustment to set the required detection level; and thirdly the detection level is a somewhat arbitrary compromise between the normal vibration encountered in practice and a vibration that could damage the washing machine. The greatest vibration due to an out-of-balance load usually occurs when the drum speed is being speeded up from the wash or rinse speed to the spin drying speed. The mechanical arrangement responds to this out-of-balance vibration and switches off the power supply. This switching-off of the washing machine during a washing programme can be very inconvenient in the case of an automatic programmed machine which is left unattended to perform the programme—particularly in view of the fact that there is probably no fault in the machine itself.

Further, such mechanical arrangements cannot detect the difference between an unbalanced load and a short-circuited SCR.

An object of the invention is at least to mitigate the above-mentioned disadvantages.

According to the invention there is provided a washing machine motor speed control circuit including a semiconductor controlled rectifier (SCR) arranged in series with the motor and a trigger circuit for firing the SCR at a controllably variable instant in each half cycle of an AC mains supply voltage, applied to the series circuit, in order to control the average power applied to the motor, characterised in that the circuit further includes means for detecting a short circuit fault in said SCR comprising a bistable device arranged to be set to its first state each time the modulus of the mains supply voltage drops below a first value and thereafter to be set to its second state only if the modulus of the voltage across the SCR subsequently rises to a (second) value greater than the first value, and a logic circuit which causes the mains supply voltage to the motor to be disconnected if the bistable device is not set to its second state in each half cycle of the mains supply voltage for a given number, exceeding two, of consecutive half cycles of the same polarity or of alternating polarity.

Control circuits using SCR's rely on the fact that the SCR switches itself off at the end of each half cycle in which it has been fired when the current through its main electrodes drops below the holding current of the SCR concerned. Due to the inductance of the motor, however, the current lags the voltage and the SCR is therefore not switched off until some time (for example a period of 0.5 to 2.0 mS) after the applied voltage has passed through zero. This period depends not only upon the inductance of the motor but also upon the motor speed at the instant concerned and is hence indeterminate. Also, as mentioned above, the firing angle of the SCR can be varied between wide limits in each half cycle. Thus the time "window" in each half cycle during which the SCR should not be conducting is very variable both as to its starting instant and its duration. In practice the latter may be only momentary if the maximum power is being applied to the motor. A suitable strobing instant in each half cycle at which to check that the SCR has come out of its conducting state (i.e is not short-circuited) would therefore be difficult to determine.

In the circuit according to the invention, however, the bistable device can be strobed over very wide limits. This can be explained as follows.

Towards the end of each half cycle of the supply voltage, the modulus of the voltage is dropping towards zero and the bistable device is reset when the modulus drops below the first value. Thus at the beginning of the next half cycle the bistable device is always in the next state irrespective of the state of the SCR. The voltage across the SCR then passes through zero and, if the SCR becomes non-conducting, rises until its modulus reaches the second value, whereupon the bistable device is set to its second state. Since in normal circumstances, the SCR becomes non-conductive early in each half cycle, the bistable device may be strobed to check its state at any time from the instant the SCR becomes non-conductive up to just before the bistable device is reset at the end of the half cycle. If, for example, the state of the bistable device is strobed about half way through the cycle, then the SCR has had adequate time to come out of its conducting state in all circumstances unless the SCR has a short circuit fault. In the latter circuit, the voltage across the SCR is substantially zero and its modulus cannot reach the above-mentioned second value. In this case the bistable device cannot be set to its second state and this is used as an indication of the presence of a short circuit fault on the SCR.

In order to provide reasonable immunity from the effects of voltage or current interference spikes, the first and second values are preferably not less than 10 V and 15 V respectively.

We have found that washing machines having a motor speed control circuit using an SCR give an occasional audible out-of-balance "bump" and that this is caused by the SCR failing to come out of conduction due to the presence of interfering voltage or current spikes. We have further found that this can very occasionally happen on two consecutive half cycles of the supply voltage but we have noted no case where it occurs on three or more consecutive half cycles. For this reason, the logic circuit is arranged to respond only if a short-circuit SCR condition is detected (i.e. the bistable device not being set) for at least three consecutive half cycles of the same polarity or of alternating polarity. Under these conditions, the mains supply to the motor is only disconnected if the SCR develops a short circuit fault.

In most modern control circuits using SCR's, the SCR is a bidirectional device (triac). Such a device effectively includes two parallel diodes with opposing conductivity directions and either one or both diodes may develop a short circuit. If one diode becomes short-circuited, then the bistable device cannot be set to its second state in those half cycles having the polarity normally conducted by that diode. Therefore the control circuit responds even if only one of the two diodes is short-circuited.

In order to give a rapid response to a short-circuited SCR, the given number of half cycles used to give a "faulty SCR" response should be as low as possible without there being any possibility of responding to transient effects. For this reason, the given number of half cycles is preferably four. In this case, a fully short-circuited triac is detected in 40 mS with a 50 Hz mains supply voltage and a half short-circuited triac is detected in 70–80 mS.

When a short-circuited SCR has been detected, the logic circuit causes the mains supply voltage to the motor to be disconnected. Preferably, the mains supply voltage is disconnected by at least one electric switch operable by the logic circuit and the control circuit includes means for locking the switch in its operated state until the mains supply voltage to the washing machine is switched off by the user. The switch(es) may be of the electromagnetic or electronic type.

The invention also relates to a method of detecting a short circuit fault in the SCR of a washing machine motor speed control circuit of the type defined herein, the method including the steps of resetting a bistable device when the modulus of the mains supply voltage falls below a first level immediately prior to each zero crossing of said voltage, setting the bistable device in each half cycle of the voltage across the SCR if the modulus of said voltage rises to a value which is greater than the first value and which is indicative of the non-conducting state of the SCR and, therefore, the absence of a short circuit fault, and subsequently examining the state of the bistable device in each half cycle.

Embodiments of the invention will now be described with reference to the accompanying drawings, in which.

Figure 1:
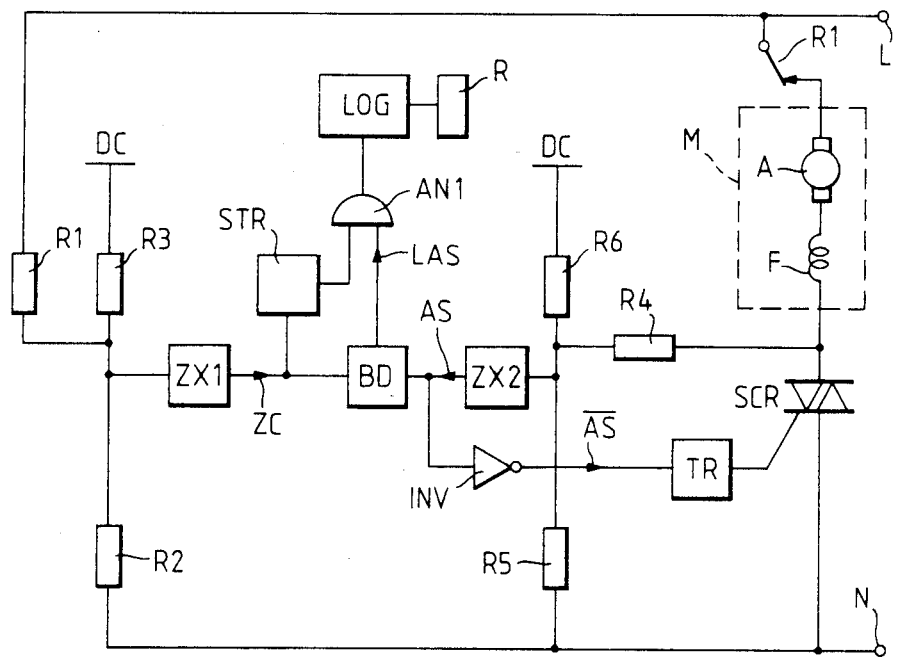
FIG. 1 is a block schematic circuit diagram of a motor speed control circuit.

Referring to FIG. 1 of the drawings, the control circuit includes a series circuit comprising a motor M having an armature A and a field winding F, a triac SCR, and the break contact R1 of a relay R. This series circuit is connected across input terminals L and N of an AC mains supply voltage of, for example, 240 V, 50 Hz. A trigger circuit TR is connected to the gate electrode of triac SCR and generates firing pulses for the triac at a controllably variable firing angle in each half cycle of the mains supply voltage. Such trigger circuits are well known and, by controlling the firing angle, control the speed of the motor and hence the rotational speed of the drum containing the wash load.

Resistors R1 and R2 form a voltage divider for the mains voltage across terminals L and N. Resistors R3 and R2 form a voltage divider for a DC supply voltage (e.g. 12 V) between rail DC and terminal N. The DC voltage is obtained from the mains supply voltage in conventional manner by means not shown in the drawings. The common tapping point of the two voltage dividers is connected to the input of a first zero voltage crossing detector ZX1.

In a similar manner, two resistors R4 and R5 form a voltage divider for the AC voltage across triac SCR and resistors R6 and R5 to form a voltage divider for the DC voltage on the rail DC. The common tapping point of these two dividers is connected to the input of a second zero voltage crossing detector ZX2.

The output of detector ZX1 is connected to the reset input of a bistable device BD and also to a strobing circuit STR. The output of detector ZX2 is connected to the set input of bistable device BD. The outputs of circuit STR and device BD are connected to respective inputs of an AND-gate AN1, the output of which is connected to a logic circuit LOG. The output of circuit LOG controls the electromagnetic relay R.

The set and reset input signals to the device BD are referred to as AS (anode sense) and ZC (mains zero crossing) respectively. The output signal of device BD is referred to as LAS (latched anode sense).

Zero crossing detector ZX1 and the values of resistors R1 and R2 are so arranged that the output of the detector ZX1 is a logic '1' only if the modulus of the voltage on terminal L drops below a first predetermined value, for example 30 V in the case of a 240 V AC mains supply voltage. Thus signal ZC is a '1' only if the voltage on terminal L lies between +30 V and −30 V. Detector ZX2 and the values of resistors R4 and R5 are so arranged that the output signal of detector ZX2 is a logic '0' if the modulus of the voltage across the triac SCR rises to a second value, e.g. 60 V, higher than the above-mentioned first value. Thus signal AS is a logic '1' if the voltage across triac SCR is between +60 V and −60 V.

The zero crossing detectors ZX1 and ZX2 in the practical embodiment were transistor circuits supplied from the 12 V DC supply rail DC in common with the other circuits. Voltage dividers R1, R2 and R4, R5 divide the mains voltage concerned down to levels that can be readily handled by these circuits. The zero crossing detectors typically comprise two voltage comparators fed with the input voltage to the detector and respective reference voltages for the two levels of detection. In the case of detector ZX1, these two levels would correspond to +30 V and −30 V on terminal L. In order to avoid the complication involved in providing a negative voltage comparator, the DC voltage dividers R3, R2 and R6, R5 are arranged to provide a positive DC bias, for example 3.8 V, on the inputs to the detectors ZX1 and ZX2. Each detector may, for example, comprise two voltage comparators a first of which is arranged to respond (give a logic '1' output) to a voltage above +1.6 V and the second of which is arranged to respond to a voltage above +6 V. The output of the second comparator is inverted and fed to one input of an AND-gate the other input of which is connected to the output of the first comparator. The output of the AND-gate is thus '1' if the input voltage to the detector concerned is between +1.6 V and +6 V. The value of resistor R1 is chosen in relation to resistor R2 such that a voltage of 30 V on terminal L produces a divided-down voltage of 2.2 V at the input to detector ZX1. Thus detector ZX1 gives a '1' output only if the voltage at terminal L is between +30 V and −30 V. Since these voltages occur close to the zero crossing point, a short '1' pulse is given each time the mains supply voltage passes through zero.

In a similar manner, the values of resistors R4 and R5 are chosen such that zero crossing detector ZX2, which is identical to detector ZX1, gives a '1' output only when the voltage across triac SCR is between +60 V and −60 V.

There are, of course, many alternative methods of providing zero crossing detectors that are well known to those versed in the art.

Figure 2:
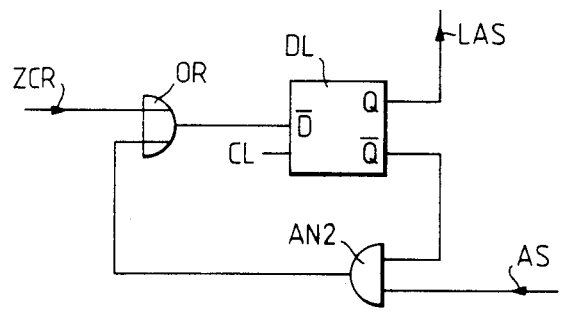
FIG. 2 is a block schematic circuit diagram of a bistable device suitable for use in the circuit shown in FIG. 1.

The operation of bistable device BD in response to input signals ZCR and AS will now be described with reference to FIG. 2. The device BD comprises an OR-gate OR the output of which is connected to the inverting ($\overline{D}$) input of a clocked D-type, or delay, flip-flop DL. The Q output of flip-flop DL provides the output signal LAS of the bistable device and the $\overline{Q}$ output is connected to one input of an AND-gate AN2, to the other input of which the signal AS is connected. The output of gate AN2 is connected to a further input of the gate OR.

If signal ZCR = '0' then Q = '1', gate AN2 is inhibited (since $\overline{Q}$ = '0') and signal AS can have no effect. When signal ZCR goes to '1', signal LAS goes to '0' on receipt of the next clock pulse on lead CL and $\overline{Q}$ going to '1' enables gate AN2. Signal AS is already '1' and this maintains the '1' at the $\overline{D}$ input of flip-flop DL when signal ZCR goes to '0'. When signal AS goes to '0', the signal on the $\overline{D}$ input of flip-flop DL goes to '0' and signal LAS goes to '1' on receipt of the next clock pulse on lead CL. The repetition rate of the clock pulses is preferably relatively high (e.g. 20 kHz) compared with the frequency of the mains supply voltage.

Figure 3:
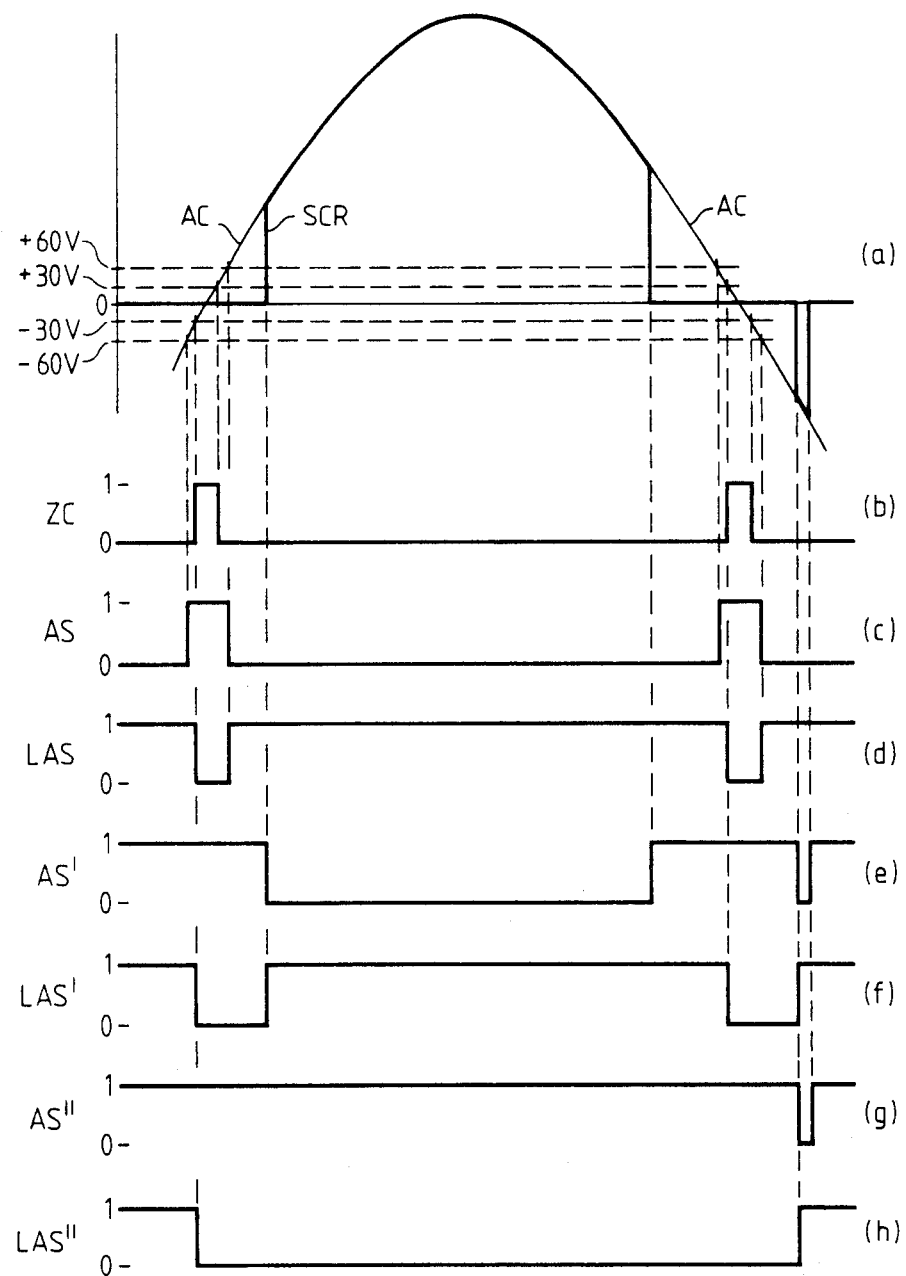
FIG. 3 shows various waveforms occurring during the operation of the circuits shown in FIGS. 1 and 2.

The related operation of the zero crossing detectors and of the bistable device will now be explained with reference to FIG. 3, waveform (a) of which shows a full sine wave AC representing the voltage of the mains supply and also the voltage across the triac SCR when the latter is not being fired in any half cycle, and a thickened line waveform SCR which represents the voltage across the triac SCR when the latter is being fired. The next waveform, (b), shows the zero crossing signal ZC, which is '1' only when the mains supply voltage is between +30 V and −30 V. As can be seen, this signal comprises a relatively short pulse at each zero crossing of the mains supply voltage. This pulse would be narrower, of course, if a lower detection voltage were used. There is no particular requirement for a very narrow pulse, however, and the value of 30 V represents a typical compromise which not only gives a reasonably narrow pulse but also gives excellent noise immunity against the effects of mains voltage spikes. For this reason the first voltage level should preferably be at least 10 V.

Waveform (c) shows the signal AS that exists in the case where the triac SCR is not being fired in any half cycle of the mains supply voltage. As can be seen, this signal is '1' only so long as the voltage across the SCR is between +60 V and −60 V.

Waveform (d) shows the output signal LAS of bistable BD when fed with the input signals shown in waveforms (b) and (c). As can be seen, the device BD is reset to its first state LAS = '0' just prior to every zero crossing when the modulus of the mains supply voltage drops below the first level of 30 V and can only be set to its second state LAS = '1' if the modulus of the voltage across triac SCR rises to a second level of (e.g.) 60 V which is greater than the first level.

If the second voltage level (60 V) were lower than the first level (30 V), then the width of the '1' pulses in signal ZC would be larger than those of signal AS—that is to say that signal ZCR would go to '1' before signal AS and remain at '1' until after signal AS has reverted to '0'. In this event signal LAS would, subject to the clocking instants, be the inverse of signal ZC irrespective of the state of signal AS at any time.

Another reason for making the second value of the voltage greater than the first is that the voltage across the triac SCR is more sensitive to interference than is the mains supply voltage. Although the second value of 60 V given in the above example gives excellent freedom from interference, a lower value could obviously be used. Preferably, however, this second value should not be less than 15 volts.

The case where the triac SCR is fired late in the half cycle and comes out of conduction early in the following half cycle will now be considered with reference to the thickened portion SCR of waveform (a) in conjunction with waveforms (b), (e), and (f). In the example represented in the positive half cycle of waveform (a), the triac SCR is assumed to come out of its conducting state about 20° into the half cycle due to the lagging motor current. Prior to this, the zero crossing pulse of signal ZC (waveform (b)) has reset the bistable device BD to LAS = '0' (waveform (f)) and signal AS' (waveform (e)) is '1' since the voltage across triac SCR is substantially zero. When the triac SCR comes out of conduction the voltage across it rises to above +60 V and signal AS' therefore goes to '0'. At the next clock pulse, signal LAS' goes back to its '1' (set) state. The clock pulse repetition rate is assumed to be so high that the delays in the operation of flip-flop DL are not detectable in the waveforms shown in the Figure.

Triac SCR is then fired by the trigger circuit at a firing angle of about 150° and the voltage across it, as shown by the thick line in waveform (a), drops substantially to zero. Signal AS' accordingly goes to '1' but this has no effect on signal LAS' which, therefore, is reset to '0' at the next rising edge of signal ZC.

In the next (negative-going) half cycle, it is assumed that the triac is fired immediately it has ceased to conduct, i.e. the extreme adverse condition. It is to be noted that, while signal AS' responds to this condition, the waveform of signal LAS' remains unaffected—that is to say that the duration of the reset ('0') pulse remains unchanged irrespective of when the triac is fired in each half cycle. It is only affected, in fact, by the instant at which the triac ceases to conduct in each half cycle.

Waveforms (a) and (e) show what would normally be the latest instant at which the triac ceases to conduct. In most cases the triac would cease to conduct rather earlier in each half cycle than is shown in the Figure—in fact in some cases it would cease to conduct before the arrival of the falling edge of signal AS in waveform (c), i.e. before the modulus of the mains supply voltage reaches 60 V. This would not, of course, affect signal AS which would remain at '1' until the voltage across the SCR reached the second value of 60 V. Waveforms (d) and (f) thus represent two extreme conditions and it can be seen that the difference in these waveforms is very small and that, substantially irrespective of the firing instants, the bistable device BD is set to its second state (LAS='1') for the major part of each half cycle provided that the triac does in fact come out of conduction during each half cycle. It is therefore apparent from waveforms (d) and (f) that a strobing test to check that device BD has reached its set state can be made at any instant within a very wide time period.

Any firing pulse that may occur before the triac ceases to conduct in any half cycle would of course have no effect and would be lost. To prevent this, the signal AS shown in FIG. 1 is inverted to $\overline{AS}$ by an inverter INV and enables the trigger circuit to provide a trigger pulse only if $\overline{AS}$=1—i.e. only if the triac has ceased to conduct.

If the triac develops a short circuit fault of any type, then the voltage across it can never reach the second level of 60 V and the signal AS remains at '1'. Therefore the bistable device cannot be set and signal LAS remains at '0'. If, for example, the triac is short-circuited only for the positive half cycles then the appropriate signal AS" (waveform (g)) will remain at '1' and the resulting signal LAS" (waveform (h)) cannot reach the '1' (set) state during any of these half cycles.

Conveniently, the signal LAS may be strobed at about the middle of each half wave cycle by means of the strobe circuit STR and gate AN1. The various ways of achieving this will be obvious to those skilled in the art. For example the strobing circuit STR may include a counter which is driven by clock pulses and which is set to its count state by each zero crossing pulse ZC and gives an output pulse and resets to zero when it reaches a predetermined count value. The clock pulse repetition rate and the count value can be chosen to provide a strobing pulse to the one input of gate AN1 approximately in the middle of each half cycle. Another method would be to feed each zero crossing pulse ZC into a clocked shift register which delays the pulse for about one-quarter of a cycle of the mains supply voltage. Thus an information signal LAS='0' (SCR short circuit) or LAS='1' (SCR O.K.) is fed to the logic circuit LOG once in every half cycle of the mains supply voltage.

Figure 4:
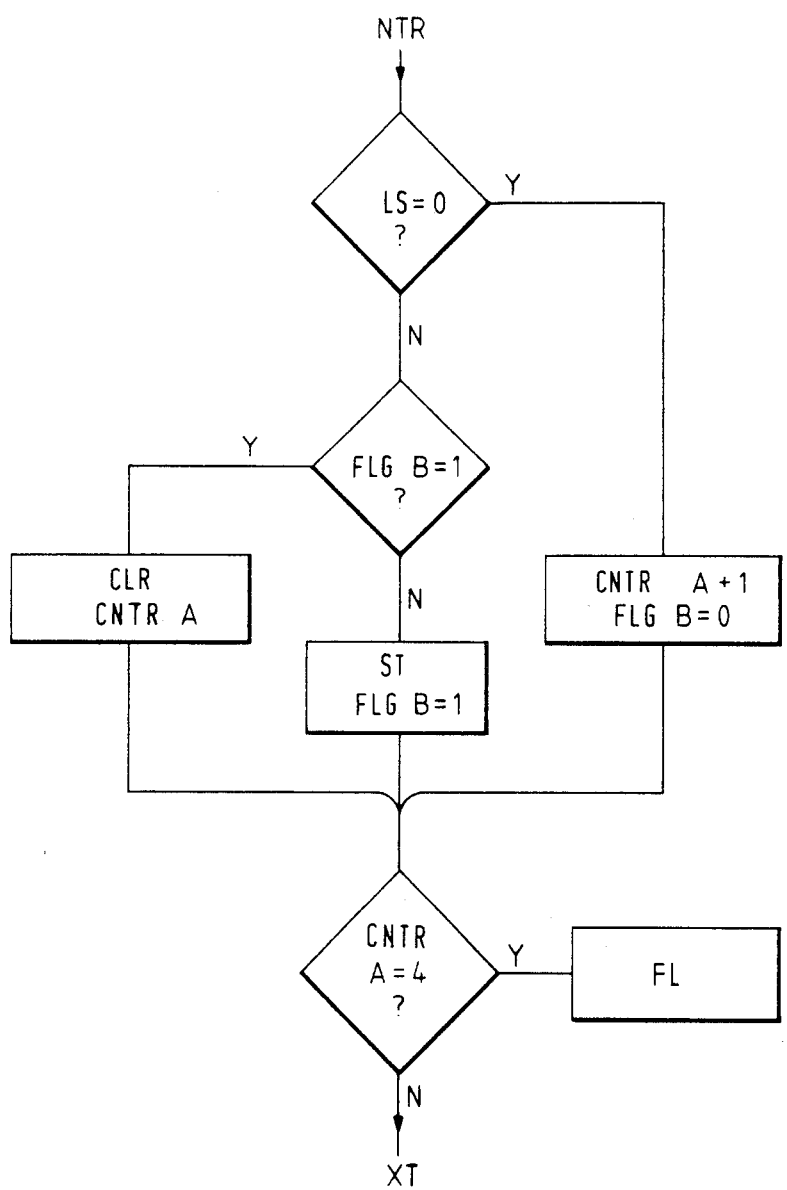
FIG. 4 is a flow chart showing the operational sequence of the logic circuit shown in FIG. 1.

The operation of the logic circuit LOG is most simply explained with reference to the flow chart given in FIG. 4. The circuit concerned includes a counter A and a flag B (e.g. a flip-flop). If the triac SCR has no short-circuited diode portion, then in each half cycle LAS='1' at the strobing instant and so flag B is set to '1' and '0' on alternate half cycles. Counter A remains at zero count and the programme is self-repetitive. If it is now assumed that the triac has a unidirectional short circuit such that it is a short circuit on half cycles of one polarity only, then for cycles of the one polarity (assumed to be the odd cycles) LAS='0' and for the other (even) half cycles LAS='1'. The Table shows the sequence of events leading to the switching off of the motor after seven half cycles. If the triac had only its other diode portion short-circuited (i.e. affecting the even-numbered half cycles), then using the sequence in the Table the motor would be switched off after eight half cycles.

TABLE

|  | HALF CYCLE NUMBER | | | | | | |
|---|---|---|---|---|---|---|---|
|  | 1 | 2 | 3 | 4 | 5 | 6 | 7 |
| SIGNAL LAS | 0 | 1 | 0 | 1 | 0 | 1 | 0 |
| COUNTER A | 1 | — | 2 | — | 3 | — | 4 |
| FLAG B | 0 | 1 | 0 | 1 | 0 | 1 | 0 |
| SWITCH OFF MOTOR? | — | — | — | — | — | — | YES |

If the triac has both diode portions short-circuited, then LAS='0' in every half cycle and the counter A is incremented by one in each half cycle. The counter reaches the count of four after four half cycles and the motor is switched off.

In each case the motor is switched off by the logic circuit operating a disconnection switch. In FIG. 1 the switch is an electromagnetic relay R which, when operated by the logic circuit LOG, disconnects the mains supply voltage to the motor at its break contact R1. Alternatively, the switch may be of the wholly electronic type well known to those skilled in the art.

With the mains supply to the motor M and triac SCR switched off, signal AS becomes a permanent '1' and signal LAS becomes a permanent '0'. Thus the logic circuit will continue to detect the failure condition and so keep the relay R operated. Preferably, however, relay R is provided with a locking circuit, not shown, which for example locks the relay via one of its own contacts across the DC supply. In such a case, the relay can only be released by switching off the mains supply to the washing machine, thereby providing complete safety of operation.

I claim:

1. A washing machine motor speed control circuit comprising: a semiconductor controlled rectifier (SCR) connected in series with the motor to an AC mains supply voltage, a trigger circuit for firing the SCR at a controllably variable instant in each half cycle of the AC mains supply voltage in order to control the average power applied to the motor, means for detecting a short circuit fault in said SCR comprising a bistable device arranged to be set to a first state each time the modulus of the mains supply voltage drops below a first value and thereafter to be set to a second state only if the modulus of the voltage across the SCR subsequently rises to a second value greater than the first value, and a logic circuit which causes the mains supply voltage to the motor to be disconnected if the bistable device is not set to its second state in each half cycle of the mains supply voltage for a given number, exceeding two, of consecutive half cycles of the same polarity or of alternating polarity.

2. A control circuit as claimed in claim 1 including means for preventing the trigger circuit from providing a firing pulse to the SCR unless the bistable device is in its second state.

3. A control circuit as claimed in claim 1, wherein the said first and second values are not less than 10 V and 15 V respectively.

4. A control circuit as claimed in claim 1, wherein the said given number of half cycles is four.

5. A washing machine including a control circuit as claimed in claim 1.

6. A method of detecting a short circuit fault in the SCR of a washing machine motor speed control circuit of the type defined herein, the method including the steps of resetting a bistable device when the modulus of the mains supply voltage falls below a first level immediately prior to each zero crossing of said voltage, setting the bistable device in each half cycle of the voltage across the SCR if the modulus of said voltage rises to a value which is greater than the first value and which is indicative of the non-conducting state of the SCR and, therefore, the absence of a short circuit fault, and subsequently examining the state of the bistable device in each half cycle.

7. A method as claimed in claim 6 including the further step of disconnecting the mains supply to the motor if said examination indicates that the bistable device has not reached the set state in each of at least three consecutive half cycles of the same polarity or of alternating polarity.

8. A motor speed control circuit comprising: a semiconductor controlled rectifier (SCR) connected in series circuit with the motor, means for controlling the supply of an AC voltage to said series circuit, a trigger circuit having an output coupled to a control electrode of the SCR for applying a trigger signal thereto at a controllably variable instant in each half cycle of the AC voltage so as to control the average power applied to the motor, means for detecting a short circuit of said SCR including a bistable device having first and second inputs coupled to the AC voltage and the SCR, respectively, such that the bistable device is set to a first state each time the AC voltage drops below a first value and is thereafter set to a second state only if the voltage across the SCR achieves a second value greater than the first value, and a logic circuit controlled by an output of the bistable device and in turn controlling said AC voltage supply controlling means to disconnect the supply of AC voltage to the series circuit including the motor if the bistable device is not set to said second state in each half cycle of the AC voltage for a number of consecutive half cycles thereof exceeding two and of the same polarity or of alternating polarity.

9. A speed control circuit as claimed in claim 8 wherein said short circuit detecting means includes first and second zero voltage crossing detectors coupled to a terminal of the AC voltage supply and said first input of the bistable device and between the second input of the bistable device and a junction point between the motor and the SCR, respectively.

10. A speed control circuit as claimed in claim 9 further comprising a strobing circuit coupled between an output of the first zero voltage crossing detector and a first input of an AND gate, and means coupling a second input of the AND gate to the output of the bistable device and an output of the AND gate to an input of the logic circuit.

11. A speed control circuit as claimed in claim 8 wherein the means for controlling the supply of AC voltage to said series circuit comprises a switching device controlled by the logic circuit and connected between a terminal of the series circuit and an input terminal for the AC voltage.

12. A method of detecting a short circuit of an SCR in a motor speed control circuit wherein the SCR is connected in series circuit with a motor to a source of AC supply voltage, said method comprising: resetting a bistable device at a first voltage level in the vicinity of each zero crossing of said AC supply voltage, setting the bistable device in each half cycle of the AC voltage across the SCR if said voltage reaches a second level greater than said first voltage level and which is indicative of the absence of a short circuit of the SCR, and determining the state of the bistable device in each half cycle of the AC supply voltage.

13. A method as claimed in claim 12 comprising the further step of disconnecting the AC supply voltage from the motor if it is determined that the bistable device was not placed in the set state in each of at least three consecutive half cycles of the AC supply voltage.

* * * * *

UNITED STATES PATENT AND TRADEMARK OFFICE
CERTIFICATE OF CORRECTION

PATENT NO. : 4,524,403

DATED : June 18, 1985

INVENTOR(S) : SIYA V. SETH

It is certified that error appears in the above-identified patent and that said Letters Patent is hereby corrected as shown below:

```
Claim 6, line 3, change "including" to
        --comprising--;
        line 5, change "level" to --value--
```

Signed and Sealed this

Fifteenth Day of April 1986

[SEAL]

Attest:

DONALD J. QUIGG

Attesting Officer

Commissioner of Patents and Trademarks